United States Patent
Akhteruzzaman et al.

(10) Patent No.: US 7,110,515 B2
(45) Date of Patent: Sep. 19, 2006

(54) REMEMBRANCE-PROMOTED NUMBER RECEIPT FOR CALL ALLOWANCE

(75) Inventors: A. Akhteruzzaman, Naperville, IL (US); Paul Raymond Sand, Woodridge, IL (US); Claudis L. Young, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 213 days.

(21) Appl. No.: 10/128,183

(22) Filed: Apr. 23, 2002

(65) Prior Publication Data

US 2003/0198327 A1 Oct. 23, 2003

(51) Int. Cl.
*H04M 3/42* (2006.01)
*H04M 15/00* (2006.01)

(52) U.S. Cl. .............. 379/201.01; 379/114.15; 379/114.19

(58) Field of Classification Search ........ 379/201.01, 379/112, 114.01, 114.03, 114.15, 114.16, 379/114.19, 114.2, 114.22, 114.26, 118, 143, 379/144.01–144.05, 357.01, 123, 127.04
See application file for complete search history.

(56) References Cited

U.S. PATENT DOCUMENTS

| 5,479,494 | A | * | 12/1995 | Clitherow | 379/114.15 |
|---|---|---|---|---|---|
| 5,675,607 | A | * | 10/1997 | Alesio et al. | 379/114.02 |
| 5,825,871 | A | * | 10/1998 | Mark | 379/357.03 |
| 5,859,900 | A | * | 1/1999 | Bauer et al. | 379/114.21 |
| 6,088,683 | A | * | 7/2000 | Jalili | 705/26 |
| 6,170,745 | B1 | * | 1/2001 | Schilling | 235/382.5 |
| 6,269,155 | B1 | * | 7/2001 | Dennert | 379/114.05 |
| 6,327,353 | B1 | * | 12/2001 | Fukuzawa et al. | 379/201.01 |
| 6,341,724 | B1 | * | 1/2002 | Campisano | 235/380 |
| 6,356,630 | B1 | * | 3/2002 | Cai et al. | 379/144.01 |
| 6,393,117 | B1 | * | 5/2002 | Trell | 379/207.1 |
| 6,473,500 | B1 | * | 10/2002 | Risafi et al. | 379/144.01 |
| 6,961,412 | B1 | * | 11/2005 | Ruckart et al. | 379/114.2 |
| 2002/0162029 | A1 | * | 10/2002 | Allen et al. | |
| 2002/0172345 | A1 | * | 11/2002 | Wu | |
| 2002/0187779 | A1 | * | 12/2002 | Freeny, Jr. | |
| 2003/0083042 | A1 | * | 5/2003 | Abuhamdeh | |
| 2003/0174822 | A1 | * | 9/2003 | Moon et al. | |

OTHER PUBLICATIONS

"Database"; http://www.dictionary.com/search?q=database; Lexico, LLC; Lexico, LLC, 13428 Maxella Avenue #236, Marina del Rey, CA 90292; 2 pgs.; Mar. 24, 2002.

"Remembrance"; http://www.dictionary.com/search?q=remembrance; Lexico, LLC; Lexico, LLC, 13428 Maxella Avenue #236, Marina del Rey, CA 90292; 2 pgs.; Mar. 24, 2002.

"Password"; http://www.dictionary.com/search?q=password; Lexico, LLC; Lexico, LLC, 13428 Maxella Avenue #236, Marina del Rey, CA 90292; 2 pgs.; Mar. 23, 2002.

"Service prodiver"; http://www.techweb.com/encyclopedia/defineterm?term=service+provider; TechEncyclopedia; Computer Language Company, 5521 State Park Road, Point Pleasant, PA 18950; 1 pg.; Mar 27, 2002.

(Continued)

*Primary Examiner*—William J. Deane, Jr.

(57) ABSTRACT

A user is allowed to place a call to a target phone number upon receipt of one or more remembrance-promoted numbers and zero or more passwords, from the user, at an access phone number location. The one or more remembrance-promoted numbers comprise one or more of: an existing phone number employable by one or more users to place one or more direct calls to the user; and one or more numbers preselected by the user.

17 Claims, 1 Drawing Sheet

OTHER PUBLICATIONS

"Common carrier"; http://www.techweb.com/encyclopedia/defineterm.yb?term=commoncarrier; TechEncyclopedia; Computer Language Company, 5521 State Park Road, Point Pleasant, PA 18950; 1 pg.; Mar. 27, 2002.

"Private carrier"; http://www.techweb.com/encyclopedia/defineterm.yb?term=privatecarrier; TechEncyclopedia; Computer Language Company, 5521 State Park Road, Point Pleasant, PA 18950; 1 pg.; Mar. 27, 2002.

"Internet service provider"; http://www.techweb.com/encyclopedia/defineterm.yb?term=Internetserviceprovider; TechEncyclopedia; Computer Language Company, 5521 State Park Road, Point Pleasant, PA 18950; 3 pgs.; Mar. 27, 2002.

"Service provider"; http://www.dictionary.com/search?q=service%20provider; Lexico, LLC; Lexico, LLC, 13428 Maxella Avenue #236, Marina del Rey, CA 90292; 1 pg.; Mar. 27, 2002.

"1-800-CALL-ATT"; http://www.att.com/press/0297/97017.csa.html; 32 Avenue of the Americas, New York, NY 10013-2412; 10 pgs.; Mar. 28, 2002.

"HLR"; http://www.techweb.com/encyclopedia/defineterm?term=HLR; TechEncyclopedia; Computer Language Company, 5521 State Park Road, Point Pleasant, PA 18950; 1 pg.; Mar. 12, 2002.

"SS7"; http://www.techweb.com/encyclopedia/defineterm.yb?term=SS7; TechEncyclopedia; Computer Language Company, 5521 State Park Road, Point Pleasant, PA 18950; 3 pgs.; Mar. 12, 2002.

"SCP"; http://www.techweb.com/encyclopedia/defineterm?term=SCP; TechEncyclopedia; Computer Language Company, 5521 State Park Road, Point Pleasant, PA 18950; 1 pg.; Mar. 12, 2002.

"PSTN"; http://www.techweb/com/encyclopedia/defineterm?term=pstn; TechEncyclopedia; Computer Language Company, 5521 State Park Road, Point Pleasant, PA 18950; 1 pg.; Mar. 12, 2001.

"TCP/IP"; http://www.techweb.com/encyclopedia/defineterm?term=tcp%2Fip; TechEncyclopedia; Computer Language Company, 5521 State Park Road, Point Pleasant, PA 18950; 1 pg.; Mar. 12, 2002.

"NODE"; http://www.techweb.com/encyclopedia/defineterm?term=node; TechEncyclopedia; Computer Language Company, 5521 State Park Road, Point Pleasant, PA 18950; 1 pg.; Mar. 13, 2002.

"Internet"; http://www.techweb.com/encyclopedia/defineterm.yb?term=internet&FormInfo=CMP-Tech; TechEncyclopedia; Computer Language Company, 5521 State Park Road, Point Pleasant, PA 18950; 3 pgs.; Mar. 13, 2002.

"Intranet"; http://www.techweb/com/encyclopedia/defineterm.yb?term=intranet; TechEncyclopedia; Computer Language Company, 5521 State Park Road, Point Pleasant, PA 18950; 1 pg.; Mar. 13, 2002.

"IP"; http://www.techweb.com/encyclopedia/defineterm?term=ip; TechEncyclopedia; Computer Language Company, 5521 State Park Road, Point Pleasant, PA 18950; 1 pg.; Mar. 13, 2002.

"Profile"; http://www.dictionary.com/search?q=profile; Lexico, LLC; Lexico, LLC, 13428 Maxella Avenue #236, Marina del Rey, CA 90292; 6 pgs.; Mar. 13, 2002.

* cited by examiner

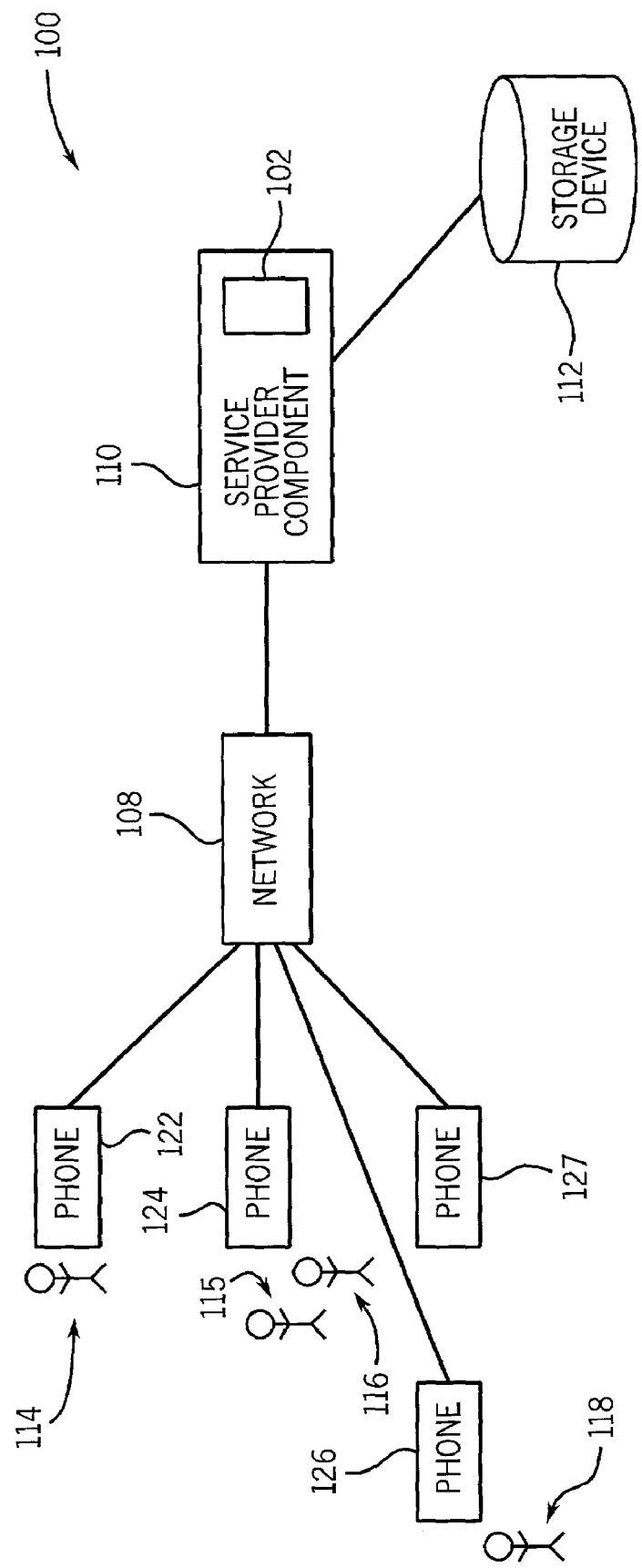

REMEMBRANCE-PROMOTED NUMBER RECEIPT FOR CALL ALLOWANCE

TECHNICAL FIELD

The invention in one example relates generally to communications and more particularly to calling cards.

BACKGROUND

In one arrangement, an entity that offers a calling card assigns to the calling card a card number that serves to associate the calling card with an account when used in conjunction with an access phone number location that a user will employ to make use of the card number. The user purchases the calling card with the card number pre-assigned to the calling card and the access phone number location predetermined. The calling card allows an initial quantity of calling time presumably commensurate with a purchase price of the calling card.

To use the calling card to call a destination phone number, the user dials the access phone number, inputs the card number during navigation through a selection menu, and dials the destination number during further navigation through the selection menu. Upon use of the calling card, the entity that offered the calling card or another entity associated therewith deducts calling time from the calling card presumably commensurately with the calling time used. The user adds additional quantities of calling time to the calling card by dialing the access phone number, inputting the card number during navigation through the selection menu, and inputting a presumably authorized credit card number during further navigation through the selection menu to incur a charge to the credit card number presumably commensurate with the additional quantities of calling time.

As one shortcoming, the arrangement requires the user to remember, or have an accessible record of, the number that the entity has assigned to the calling card. In one example, the user has difficulty remembering the number because the number lacks personal, professional, and/or historic significance to the particular user. In another example, where the user cannot reliably remember the number that the entity has assigned to the calling card, the user must carry, or have available a way to access, a record of the number. Should the user forget or misplace the assigned number, the user may lose the opportunity to use the calling card. The user in one example undesirably misses an opportunity to place a call using the calling card. In another example, the user disadvantageously misses an opportunity to use the purchased calling time of the calling card.

Thus, a need exists for promotion of remembrance of a number that a user inputs upon calling an access phone number to be allowed to place a call to a destination number.

SUMMARY

The invention in one embodiment encompasses a method. A user is allowed to place a call to a target phone number upon receipt of one or more remembrance-promoted numbers and zero or more passwords, from the user, at an access phone number location. The one or more remembrance-promoted numbers comprise one or more of: an existing phone number employable by one or more users to place one or more direct calls to the user; and one or more numbers preselected by the user.

A further embodiment of the invention encompasses an article. The article includes a computer-readable signal-bearing medium. The article includes means in the medium for allowing a user to place a call to a target phone number upon receipt of one or more remembrance-promoted numbers and zero or more passwords, from the user, at an access phone number location. The one or more remembrance-promoted numbers comprise one or more of: an existing phone number employable by one or more users to place one or more direct calls to the user; and one or more numbers preselected by the user.

DESCRIPTION OF THE DRAWING

Features of exemplary implementations of the invention will become apparent from the description, the claims, and the accompanying drawing in which:

The FIGURE is a representation of one exemplary implementation of an apparatus that comprises one or more phones, one or more networks, one or more service provider components, and one or more storage devices.

DETAILED DESCRIPTION

Turning to the FIGURE, an apparatus 100 in one example serves to allow a user to place a call to a target phone number upon receipt of one or more remembrance-promoted numbers and zero or more passwords, from the user, at an access phone number location. The one or more remembrance-promoted numbers comprise one or more of: an existing phone number employable by one or more users to place one or more direct calls to the user; and one or more numbers preselected by the user. A portion of a component of the apparatus 100 in one example comprises all of the component, and in another example comprises a subportion of the component, where the subportion of the component comprises less than all of the component.

The apparatus 100 in one example employs at least one computer-readable signal-bearing medium. One example of a computer-readable signal-bearing medium for the apparatus 100 comprises an instance of a recordable data storage medium 102 such as one or more of a magnetic, electrical, optical, biological, and atomic data storage medium. In another example, a computer-readable signal-bearing medium for the apparatus 100 comprises a modulated carrier signal transmitted over a network comprising or coupled with the apparatus 100, for instance, one or more of a telephone network, a local area network ("LAN"), the internet, and a wireless network. An exemplary component of the apparatus 100 employs and/or comprises a set and/or series of computer instructions written in or implemented with any of a number of programming languages, as will be appreciated by those skilled in the art.

In one example, one or more of users 114, 115, 116, and 118 employ one or more portions of the apparatus 100. The apparatus 100 in one example comprises one or more of phones 122, 124, 126, and 127, one or more networks 108, one or more service provider components 110, and one or more storage devices 112. The users 114, 115, 116, and 118 in one example comprises human operators and/or users of the phones 122, 124, 126, and 127. One or more of the users 114, 115, 116, and 118 in one example are able to employ any one or more of a set of the phones 122, 124, 126, and 127. In one example, one or more of the users 114, 115, 116, and 118 are located in different phone billing areas than one or more other of the users 114, 115, 116, and 118. In another example, one or more of the users 114, 115, 116, and 118 are located in different area codes than one or more other of the users 114, 115, 116, and 118. In yet another example, one or more of the users 114, 115, 116, and 118 are located in different countries than one or more other of the users 114, 115, 116, and 118.

One or more of the phones 122, 124, 126, and 127 in one example comprises wireline and/or wireless phones. In one example, the service provider component 110 serves to associate the phones 122, 124, 126, and 127 with respective destination numbers ("DNs"). The phones 122 and 126 in one example comprise residential or office phones of the users 114 and 118, respectively. The phone 124 in one example comprises a residential or office phone of the users 115 and 116. The phone 127 in one example comprises a public phone. For example, the service provider component 110 serves to allow one or more of the users 114, 115, 116, and 118 to employ the phone 127 to place one or more toll calls only upon insertion of money or obtaining of authorization, for example, by collect calls, operator assistance, or access to prepaid calling card accounts or one or more accounts located on the storage device 112, as described herein.

The destination numbers that the service provider component 110 serves to associate with the phones 122, 124, 126, and 127 in one example each comprises an area code plus a local number, directory listed or unlisted, of a residence or office of one or more of the users 114, 115, 116, and 118. One example of the destination numbers comprises 3123462800, where 312 comprises an area code and 346-2800 comprises a local phone number in the United States of a residence or office of one or more of the users 114, 115, 116, and 118. Another example of the destination numbers comprises the area code plus the local number of a (e.g., public) phone that is non-associated with any particular one or more of the users 114, 115, 116, and 118.

The service provider component 110 in one example serves to associate respective destination numbers with the users 114 and 118 and/or the phones 122 and 126. In one example, the service provider component 110 serves to associate one destination number with the users 115 and 116 and/or the phone 124. In another example, the service provider component 110 serves to associate first and second destination numbers with the users 115 and 116, respectively, and/or the phone 124. The service provider component 110 in one example serves to associate another destination number with the phone 127. In yet another example, the service provider component 110 serves to associate yet another destination number with a location of a portion of the service provider component 110. This destination number associated with the location of the portion of the service provider component 110 in one example comprises an access phone number, as described herein.

The network 108 in one example comprises one or more of a public switched telephone network ("PSTN"), a signaling system 7 ("SS7") network, an internet protocol ("IP") network, and a wireless network. The service provider component 110 in one example comprises one or more of a long-distance service provider component, a local service provider component, and a long-distance and local service provider component.

In one example, the service provider component 110 serves to provide phone service to one or more of users 114, 115, 116, and 118. In another example, the service provider component 110 serves to provide phone service to all of the users 114, 115, 116, and 118. In yet another example, a first service provider component 110 serves to provide phone service to a first subset of a plurality of the users 114, 115, 116, and 118, and a second service provider component 110 serves to provide phone service to a second subset of the plurality of the users 114, 115, 116, and 118. In a further example, the service provider component 110 serves to provide long-distance and local phone service to one or more of the users 114, 115, 116, and 118. In a still further example, a first service provider component 110 serves to provide long-distance phone service to one or more of the users 114, 115, 116, and 118, and a second service provider component 110 serves to provide local phone service to one or more of the users 114, 115, 116, and 118.

In a further example, the service provider component 110 employs one or more accounts located on the storage device 112 to allow one or more of the users 114, 115, 116, and 118 to employ the phone 127 to place one or more toll calls. The storage device 112 in one example comprises a database. For example, the one or more accounts employed by the service provider component 110 are located in the database on the storage device 112. The service provider component 110 in one example serves to associate first and second ones of these accounts with the users 114 and 118, respectively, and/or respective destination numbers for phones 122 and 126. In one example, the service provider component 110 serves to associate one account with the users 115 and 116 and/or one destination number. In another example, the service provider component 110 serves to associate the one account with the users 115 and 116 and/or two destination numbers. In yet another example, the service provider component 110 serves to associate first and second accounts with the users 115 and 116, respectively, and/or first and second destination numbers, respectively.

The service provider component 110 in one example serves to allow one or more of the users 114, 115, 116, and 118 to place a call to a target phone number, for example, a destination number for one of phones 122, 124, 126, and 127, upon receipt of one or more remembrance-promoted numbers and zero or more passwords, from one of the users 114, 115, 116, and 118, at the location of the portion of the service provider component 110 that is accessible by the access phone number, as described herein. In one example, the service provider component 110 presents to one or more of the users 114, 115, 116, and 118 an opportunity to employ the remembrance-promoted numbers in conjunction with the account of the one or more of the users 114, 115, 116, and 118 located on the storage device 112. The remembrance-promoted numbers in one example comprise a number of digits that serve to promote remembrance of the remembrance-promoted numbers by the one or more of the users 114, 115, 116, and 118. In one example, the number of the digits and/or the digits themselves for the remembrance-promoted numbers are fixed. In another example, the number of the digits and/or the digits themselves for the remembrance-promoted numbers are settable and/or resettable by the service provider component 110 and/or the one or more of the users 114, 115, 116, and 118 associated with the account thereof located on the storage device 112.

In one example, the remembrance-promoted numbers comprise the destination number that the service provider component 110 has associated with the one or more of the users 114, 115, 116, and 118. The service provider component 110 in one example associates the destination number with the one or more of the users 114, 115, 116, and 118 as a residential and/or office phone number of one of the users 114, 115, 116, and 118 and zero or more additional of the users 114, 115, 116, and 118. The destination number employed as the remembrance-promoted numbers in one example comprises an existing phone number that is employable by one or more of the users 114, 115, 116, and 118 to place one or more direct calls to the one or more of the users 114, 115, 116, and 118 that employs the particular remembrance-promoted numbers. In one example, the destination number employed as the remembrance-promoted numbers for the user 114 comprises an existing phone number that is employable by one or more of the users 115, 116, and 118 to place one or more direct calls to the user 114, for example, at the phone 122.

In another example, one or more of the users 114, 115, 116, and 118 select the remembrance-promoted numbers to promote remembrance by the one or more of the users 114, 115, 116, and 118 of the remembrance-promoted numbers and/or promote security to the one or more of the users 114, 115, 116, and 118 from unauthorized access to the account of the one or more of the users 114, 115, 116, and 118 located on the storage device 112. The service provider component 110 in one example presents to the one or more of the users 114, 115, 116, and 118 an initial suggestion for the remembrance-promoted numbers. In one example, the service provider component 110 presents to the one or more of the users 114, 115, 116, and 118 the suggestion that the remembrance-promoted numbers comprise the destination number that the service provider component 110 has associated with the one or more of the users 114, 115, 116, and 118.

For example, the service provider component 110 suggests to the one or more of the users 114, 115, 116, and 118 that the remembrance-promoted numbers comprise 3123462800, where 312 comprises an area code and 346-2800 comprises a local phone number in the United States of a residence or office of the user 114 and zero or more of the users 115, 116, and 118. For example, should the user 114 wish to select different values and/or a different number of digits for the remembrance-promoted numbers, the user 114 communicates with the service provider component 110 to cause a change of the remembrance-promoted numbers that are associated with the account of the user 114, and the zero or more of the users 115, 116, and 118, located on the storage device 112. The user 114 in one example selects the remembrance-promoted numbers to promote remembrance by the user 114, and/or the zero or more of the users 115, 116, and 118, of the remembrance-promoted numbers and/or promote security to the user 114, and/or the zero or more of the users 115, 116, and 118, from unauthorized access to the account of the user 114 and the zero or more of the users 115, 116, and 118. For example, the user 114 selects the remembrance-promoted numbers to comprise one or more of personal, professional, and historic significance. In one example, the user 114 selects the remembrance-promoted numbers to comprise ten digits such as 0519891992 that in one example serve to promote remembrance thereof as indicative of the month, May, and years, 1989 and 1992, in which the particular user 114 received undergraduate and professional degrees from universities. In executing a selection and/or change of the remembrance-promoted numbers for the user 114, and the zero or more of the users 115, 116, and 118, the service provider component 110 in one example updates that account, for example, in the database on the storage device 112.

One or more direct calls to the user 114 in one example comprise one or more phone calls that result from one or more of the users 115, 116, and 118 inputting the destination number, that the service provider 110 has associated with the user 114, into one or more of the phones 124, 126, and 127 to reach the user 114, for example, at the phone 122. In one example, the direct call to the phone 122 of the user 114 causes the phone 122 to ring. In another example, the direct call to the phone 122 of the user 114 results in an opportunity for the one or more of the users 115, 116, and 118 placing the call to record a message for the user 114 and/or indicate to the user 114 and/or one of the users 115, 116, and 118 making use of the phone 122, that a call attempt to the user 114 is being and/or has been made. For example, the user 114 may be away from the phone 122 or the phone 122 may already be occupied with another call. In yet another example, the direct call to the phone 122 would otherwise connect to the phone 122 to the user 114 but one or more exceptions occur, for example, all circuits are temporarily busy, the phone 122 is already occupied with another call and the user 114 has no service to otherwise handle or note the call, or a service to which the user 114 has subscribed fails.

In a further example, the service provider component 110 presents to one or more of the users 114, 115, 116, and 118 an opportunity to employ one or more passwords in conjunction with the remembrance-promoted numbers and the account of the one or more of the users 114, 115, 116, and 118 located on the storage device 112. For the same one of the accounts located on the storage device 112, the service provider component 110 in one example serves to associate one or more first passwords with a first one or more of the users 114, 115, 116, and 118 of the account, and serves to associate one or more second passwords with a second one or more of the users 114, 115, 116, and 118 of the account. The passwords in one example comprise one or more password numbers.

The password numbers in one example comprise a number of digits. In one example, the number of the digits and/or the digits themselves for the password numbers are fixed. In another example, the number of the digits and/or the digits themselves for the password numbers are settable and/or resettable by the service provider component 110 and/or the one or more of the users 114, 115, 116, and 118 associated with the account thereof located on the storage device 112.

The user 114 in one example selects the password numbers to promote remembrance by the user 114, and/or zero or more of the users 115, 116, and 118, of the password numbers and/or promote security to the user 114, and/or the zero or more of the users 115, 116, and 118, from unauthorized access to the account of the user 114 and the zero or more of the users 115, 116, and 118. For example, the user 114 selects the password numbers to comprise one or more of personal, professional, and historic significance. In one example, the password numbers comprise six digits such as 041776 that in one example serve to promote remembrance thereof as indicative of the representative day and year, $4^{th}$ of Jul., 1776, of the signing of the Declaration of Independence in the history of the United States.

The service provider component 110 in one example presents to the user 114 an initial suggestion for the password numbers. For example, should the user 114 wish to select different values and/or a different number of digits for the password numbers, the user 114 in one example communicates with the service provider component 110 to cause a change of the password numbers that are associated with the account of the user 114, and zero or more of the users 115, 116, and 118, located on the storage device 112. In executing a selection and/or change of the password numbers for the user 114, and zero or more of the users 115, 116, and 118, the service provider component 110 in one example updates that account, for example, in the database on the storage device 112.

An illustrative description of exemplary operation of one or more portions of the apparatus 100 is now presented, for explanatory purposes. The user 114 in one example communicates with the service provider component 110 to establish phone service for the user 114. The user 114 in one example obtains the phone 122. The service provider component 110 and the user 114 in one example communicate to identify a set of numbers for a destination number for the user 114, for example, to be reachable at the phone 122 when the user 114 and the phone 122 are together and available. In one example, the service provider component 110 causes phone service to be provided to the user 114 through the destination number to the phone 122. In a further example, the service provider component 110 sets up the account on the storage device 112 for the user 114, for example, by associating the user 114 and/or the destination number to the phone 122 with the account on the storage device 112 for the user 114.

The service provider component 110 in one example offers to the user 114 the opportunity to employ the remembrance-promoted numbers and the zero or more passwords in conjunction with the account of the user 114. Should the user 114 elect to employ the remembrance-promoted numbers and the zero or more passwords, the service provider component 110 associates the account with the user 114 and/or the destination number to the phone 122 and the remembrance-promoted numbers and/or the zero or more passwords. In a still further example, the service provider component 110 informs the user 114 of the access phone number. The access phone number in one example comprises a destination number that is associated with a particular location of a portion of the service provider component 110. In one example, the access phone number comprises a toll-free number such as the number 1-800-CALL-ATT (1-800-225-5288) offered by AT&T Cow., 32 Avenue of the Americas, New York, N.Y. 10013-2412.

The user 114 in one example elects to accept the opportunity to employ the remembrance-promoted numbers and the zero or more passwords in conjunction with the account located on the storage device 112. In one example, the user 114 accesses the phone 127. For example, the user 114 employs the phone 127 to place a call to the access phone number associated with the location of the portion of the service provider component 110. The service provider component 110 and the user 114 at the phone 127 in one example communicate so the user 114 inputs the remembrance-promoted numbers and the zero or more passwords in conjunction with the account for the user 114 located on the storage device 112. In one example, the service provider component 110 accesses the account for the user 114 located on the storage device 112 to verify the correctness of the remembrance-promoted numbers and the zero or more passwords for that account of the user 114.

Should the service provider component 110 determine the remembrance-promoted numbers and the zero or more passwords are incorrect for the account, then the service provider component 110 in one example declines to offer the user 114 an opportunity to place a call to a target phone number using that account. If the service provider component 110 determines the remembrance-promoted numbers and the zero or more passwords are correct for the particular account, then the service provider component 110 in one example allows the user 114 the opportunity to place a call to a target phone number using that account. For example, the service provider component 110 provides a prompt and/or signal to the user 114 allowing the opportunity to place the call. In response to the prompt and/or signal, the user 114 in one example inputs as the target phone number the destination number for the phone 126 to place a call to the user 118 at the phone 126.

The service provider component 110 in one example connects the call from the user 114 at the phone 127 to the user 118 at the phone 126. In a further example, the service provider component 110 serves to automatically bill the call from the user 114 at the phone 127 to the user 118 at the phone 126 to the account of the user 114 located on the storage device 112. The bill for the call from the user 114 at the phone 127 to the user 118 at the phone 126 is automatically included in the charges incurred for that account and payment of which in one example is the responsibility of the user 114.

In one example, the user 115 employs the phone 126 to place a call to the user 114 at the phone 122 and the user 116 employs the phone 127 to place a call to the user 115 at the phone 126. In one example, the service provider component 110 allows the calls upon receipt of the remembrance-promoted numbers and the zero or more passwords for the account of the users 115 and 116 during connection through the access phone number. As the target phone number for the call to the user 114 at the phone 122, the user 115 in one example inputs the destination number for the phone 122 to the service provider component 110. As the target phone number for the call to the user 115 at the phone 126, the user 116 in one example inputs the destination number for the phone 126 to the service provider component 110. For example, the service provider component 110 serves to automatically bill the call from the user 115 at the phone 126 to the user 114 at the phone 122 and the call from the user 116 at the phone 127 to the user 114 at the phone 126 to the account of the users 115 and 116 located on the storage device 112.

In another example, the user 115 employs the phone 126 to place a call to the user 114 at the phone 122 and the user 116 employs the phone 127 to place a call to the user 115 at the phone 126. In one example, the service provider component 110 allows the call from the user 115 at the phone 126 to the user 114 at the phone 122 upon receipt of the remembrance-promoted numbers and one or more first passwords for the account during connection through the access phone number 136, and the service provider component 110 allows the call from the user 116 at the phone 127 to the user 114 at the phone 126 upon receipt of the remembrance-promoted numbers and one or more second passwords for the same account during connection through the access phone number. As the target phone number for the call to the user 114 at the phone 122, the user 115 in one example inputs the destination number for the phone 122 to the service provider component 110. As the target phone number for the call to the user 115 at the phone 126, the user 116 in one example inputs the destination number for the phone 126 to the service provider component 110. For example, the service provider component 110 serves to automatically bill the call from the user 115 at the phone 126 to the user 114 at the phone 122 and the call from the user 116 at the phone 127 to the user 114 at the phone 126 to the shared account of the users 115 and 116 located on the storage device 112. In a further example, the service provider component 110 in the bill to the account of the users 115 and 116 serves to automatically segregate and/or distinctly indicate the first charge for the call from the user 115 at the phone 126 to the user 114 at the phone 122 and the second charge for the call from the user 116 at the phone 127 to the user 114 at the phone 126, for example, based on the one or more first passwords employed by the user 115 for that account and/or the one or more second passwords employed by the user 116 for the shared account.

In yet another example, the service provider component 110 allows the call from the user 115 at the phone 126 to the user 114 at the phone 122 upon receipt of the remembrance-promoted numbers and the zero or more passwords for the account of the user 115 during connection through the access phone number, and the service provider component 110 allows the call from the user 116 at the phone 127 to the user 114 at the phone 126 upon receipt of the remembrance-promoted numbers and the zero or more passwords for the account of the user 116 during connection through the access phone number. As the target phone number for the call to the user 114 at the phone 122, the user 115 in one example inputs the destination number for the phone 122 to the service provider component 110. As the target phone number for the call to the user 115 at the phone 126, the user 116 in one example inputs the destination number for the phone 126 to the service provider component 110. In a further example, the service provider component 110 serves to automatically bill the call from the user 115 at the phone 126 to the user 114 at the phone 122 to the account of the user 115. In a still further example, the service provider component 110 serves to automatically bill the call from the user 116 at the phone 127 to the user 114 at the phone 126 to the account of the user 116.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method of allowing a user of a communication service, to place a telephone call through a communications service provider's component of a communications network, comprising the steps of:
    receiving, at a service provider's component of a communications network from a first telephone that is coupled to the service's provider's component, a unique remembrance-promoted number at least partially selected by the user and provided by a communications service provider, and which is associated with an account for the user that is provided by the service provider, wherein the number of digits for the unique remembrance-promoted number is settable and resettable by the user;
    receiving, at the service provider's component of the communications network, from the first telephone, a destination phone number, not limited to the destination phone number of the user, to which a telephone call from the first telephone is to be routed via the communications network;
    routing the call from the first telephone to the destination number, through the communications network; and
    charging a cost of the call to the account of the user.

2. The method of claim 1, wherein the step of routing the call comprises the step of:
    allowing the user to place the call to the destination phone number through the communications network, upon the service provider's component's receipt of one or more user-selected remembrance-promoted passwords from the first telephone.

3. The method of claim 2, wherein the step of routing the call to the destination number upon receipt of the unique remembrance-promoted number, is further comprised of the step of: providing a user-selected remembrance-promoted password number, of the one or more user-selected remembrance-promoted password numbers, to the service provider's component ahead.

4. The method of claim 1, wherein the step of routing the call through the communications network is comprised of routing the call through at least part of a service provider's component.

5. The method cf claim 3, wherein the user comprises a first user, and wherein the call comprises a first call, and wherein the user-selected remembrance-promoted password comprises one or more first password numbers, the method further comprising the step of:
    allowing a second user to place a second call via the network to a second destination number upon the service provider's component's receipt of the unique remembrance-promoted number at least partially selected by the user and one or more user-selected remembrance-promoted second password numbers, selected by the second user, from a second telephone.

6. The method of claim 5, further comprising the step of: billing the first call and the second call to the user's account.

7. The method of claim 2, wherein the step of allowing the user to place the call to the destination number upon receipt of the one or more unique remembrance-promoted numbers at least partially selected by the user and zero or more user-selected remembrance-promoted passwords, from the user, from the first telephone comprises the step of:
    accessing a database to determine whether a relation exists between an account pre-associated with the user and the one or more unique remembrance-promoted numbers at least partially selected by the user to allow the user to place the call to the destination phone number.

8. An article, comprising:
    a computer-readable signal-bearing medium; said computer-readable signal-bearing medium bearing computer-executable instructions, which when executed cause a computer to:
    allow a communications system user to place a call through the communications system to a phone number, not limited to the destination phone number of the user, upon the computer's receipt of one or more unique remembrance-promoted numbers at least partially selected by the user, and the computer's receipt of zero or more user-selected remembrance-promoted passwords, from the user, from a telephone that is coupled to a service provider's component of the communications system, wherein the number of digits for the unique remembrance-promoted number is settable and resettable by the user,
    wherein the one or more unique remembrance-promoted numbers comprise one or more of:
    an existing phone number selected by the user and employable by the user to place one or more calls through the communications system; and
    one or more numbers selected by the user.

9. The article of claim 8, wherein the one or more unique remembrance-promoted numbers comprise an existing phone number employable by the user to place the one or more calls, and wherein the computer-readable signal-bearing medium further includes instructions, which when executed cause the computer to:

allow the user to place the call to the phone number upon receipt of the one or more unique remembrance-promoted numbers at least partially selected by the user, that comprise an existing phone number selected by the user, employable by the one or more users to place the one or more direct calls to the user, and the zero or more user-selected remembrance-promoted passwords, from the user.

10. The article of claim 8, further comprising:
computer-readable instructions for automatically billing the call to an account pre-associated with user.

11. The article of claim 8 further comprising, computer program instructions, which when executed, cause the computer to:
access a database to determine if a relation exists between an account pre-associated with the user and the one or more unique remembrance-promoted numbers at least partially selected by the user to allow the user to place the call to the phone number.

12. A method, comprising the steps of:
receiving a unique remembrance-promoted number of one or more unique remembrance-promoted numbers, wherein the unique remembrance-promoted number is at least partially selected by the user and associated with an account for the user which is provided by a service provider, and wherein the number of digits for the unique remembrance-promoted number is settable and resettable by the user,
receiving, from a telephone, a destination number, not limited to the destination phone number of the user, to which a call from the telephone is to be routed;
routing the call from the telephone to the destination number; and
charging the call to the account of the user.

13. The method of claim 12, wherein the step of routing the call from the telephone to the destination number comprises the step of:
allowing the user to place the call to the destination number upon receipt of one or more user-selected remembrance-promoted passwords from the telephone.

14. The method of claim 13, wherein the step of routing the call from the telephone to the destination number comprises the step of:
providing a user-selected remembrance-promoted password number, of the one or more user-selected remembrance-promoted passwords, to a service provider component.

15. The method of claim 13, wherein the user comprises a first user, and wherein the telephone comprises a first telephone, and wherein the call comprises a first call, wherein the destination number comprises a first destination number, and wherein the one or more user-selected remembrance-promoted password numbers comprise one or more user-selected remembrance-promoted first password numbers, the method further comprising the step of:
allowing a second user to place a second call to a second destination number upon receipt of the unique remembrance-promoted number at least partially selected by the user and one or more user-selected remembrance-promoted second password numbers from the second user from a second telephone.

16. The method of claim 15, further comprising the step of:
billing the first call and the second call to the account for the first user.

17. The method of claim 12, wherein the step of allowing the user to place the call to the destination number upon receipt of the one or more user-selected remembrance-promoted passwords from the telephone comprises the step of:
accessing a database to determine if a relation exists between an account pre-associated with the user and the one or more unique remembrance-promoted numbers at least partially selected by the user to allow the user to place the call to the destination number.

* * * * *